United States Patent
Gokam et al.

(10) Patent No.: US 11,379,387 B2
(45) Date of Patent: Jul. 5, 2022

(54) STORAGE SYSTEM WITH SUBMISSION QUEUE SELECTION UTILIZING APPLICATION AND SUBMISSION QUEUE PRIORITY

(71) Applicant: EMC IP Holding Company LLC, Hopkinton, MA (US)

(72) Inventors: Kurumurthy Gokam, Bangalore (IN); Venkatesh Doddamane Nagaraj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 545 days.

(21) Appl. No.: 16/529,900

(22) Filed: Aug. 2, 2019

(65) Prior Publication Data

US 2021/0034552 A1 Feb. 4, 2021

(51) Int. Cl.
*G06F 3/06* (2006.01)
*G06F 13/16* (2006.01)

(52) U.S. Cl.
CPC .......... *G06F 13/1642* (2013.01); *G06F 3/067* (2013.01); *G06F 3/0607* (2013.01); *G06F 3/0631* (2013.01); *G06F 3/0679* (2013.01)

(58) Field of Classification Search
CPC .. G06F 13/1642; G06F 3/0604; G06F 3/0607; G06F 3/0617; G06F 3/0631; G06F 3/0635; G06F 3/0659; G06F 3/067; G06F 3/0679; G06F 3/0688
See application file for complete search history.

(56) References Cited

U.S. PATENT DOCUMENTS

| | | |
|---|---|---|
| 6,687,746 B1 | 2/2004 | Shuster et al. |
| 6,697,875 B1 | 2/2004 | Wilson |
| 7,454,437 B1 | 11/2008 | Lavallee et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,904,681 B1 | 3/2011 | Bappe et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Yong J Choe
(74) *Attorney, Agent, or Firm* — Ryan, Mason & Lewis, LLP (57) ABSTRACT

A host device comprises a plurality of communication adapters and is configured to communicate with a storage system. Each communication adapter comprises a plurality of input-output (IO) submission queues each having a submission queue priority class. A multi-path input-output (MPIO) driver is configured to deliver IO operations to the storage system over the network. The MPIO driver obtains an IO operation that targets a given logical volume of the storage system and determines a process tag value associated with the obtained IO operation. A mapping between the determined process tag value and a given submission queue priority class is determined and IO submission queues are identified as having the given submission queue priority class based at least in part on the mapping. A target IO submission queue is selected from the identified IO submission queues and the IO operation is dispatched to the selected target IO submission queue.

20 Claims, 3 Drawing Sheets

(56) References Cited

U.S. PATENT DOCUMENTS

| | | | |
|---|---|---|---|
| 7,925,872 | B2 | 4/2011 | Lai et al. |
| 9,400,611 | B1 | 7/2016 | Raizen |
| 9,594,780 | B1 | 3/2017 | Esposito et al. |
| 9,778,852 | B1 | 10/2017 | Marshak et al. |
| 10,353,714 | B1 | 7/2019 | Gokam et al. |
| 2004/0010563 | A1 | 1/2004 | Forte et al. |
| 2008/0043973 | A1 | 2/2008 | Lai et al. |
| 2011/0197027 | A1 | 8/2011 | Balasubramanian et al. |
| 2012/0159474 | A1 | 6/2012 | Chakhaiyar et al. |
| 2016/0117113 | A1 | 4/2016 | Li et al. |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

K. Joshi et al., "Enabling NVMe WRR Support in Linux Block Layer," In 9th USENIX Workshop on Hot Topics in Storage and File Systems (HotStorage '17), Santa Clara, CA, 2017. USENIX Association, 6 pages.

U.S. Appl. No. 15/795,653 filed in the name of Maneesh Pusalkar et al. filed Oct. 27, 2017 and entitled "Storage System with Network-Wide Configurable Device Names."

U.S. Appl. No. 15/849,828 filed in the name of Sanjib Mallick et al. filed Dec. 21, 2017 and entitled "Storage System with Input-Output Performance Control Utilizing Application Process Detection."

STORAGE SYSTEM WITH SUBMISSION QUEUE SELECTION UTILIZING APPLICATION AND SUBMISSION QUEUE PRIORITY

FIELD

The field relates generally to information processing systems, and more particularly to storage in information processing systems.

BACKGROUND

Storage arrays and other types of storage systems are often shared by multiple host devices over a network. A host device may comprise a multi-path input-output (MPIO) driver that is configured to process input-output (IO) operations for delivery from the host device to the storage system. In some cases, the host devices may implement a non-volatile memory express (NVMe) architecture in which NVMe hardware bus adapters (HBAs) of the host device have multiple IO submission queues. Utilizing existing multi-pathing techniques with host devices implementing an NVME architecture may result in various inefficiencies in the storage system.

SUMMARY

In one embodiment, an apparatus comprises a host device that is configured to communicate over a network with a storage system comprising a plurality of storage devices. The host device comprises at least one processing device and a plurality of communication adapters. Each communication adapter comprises a plurality of input-output submission queues where each of the input-output submission queues has a submission queue priority class. The host device further comprises a multi-path input-output driver that is configured to deliver input-output operations from the host device to the storage system over the network. The multi-path input-output driver is further configured to obtain an input-output operation that targets a given logical volume of the storage system and to determine a process tag value associated with the obtained input-output operation. The multi-path input-output driver is further configured to determine a mapping between the determined process tag value and a given submission queue priority class and to identify one or more of the input-output submission queues as having the given submission queue priority class based at least in part on the mapping. The multi-path input-output driver is further configured to select a target input-output submission queue from the identified one or more input-output submission queues and to dispatch the input-output operation to the selected target input-output submission queue.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
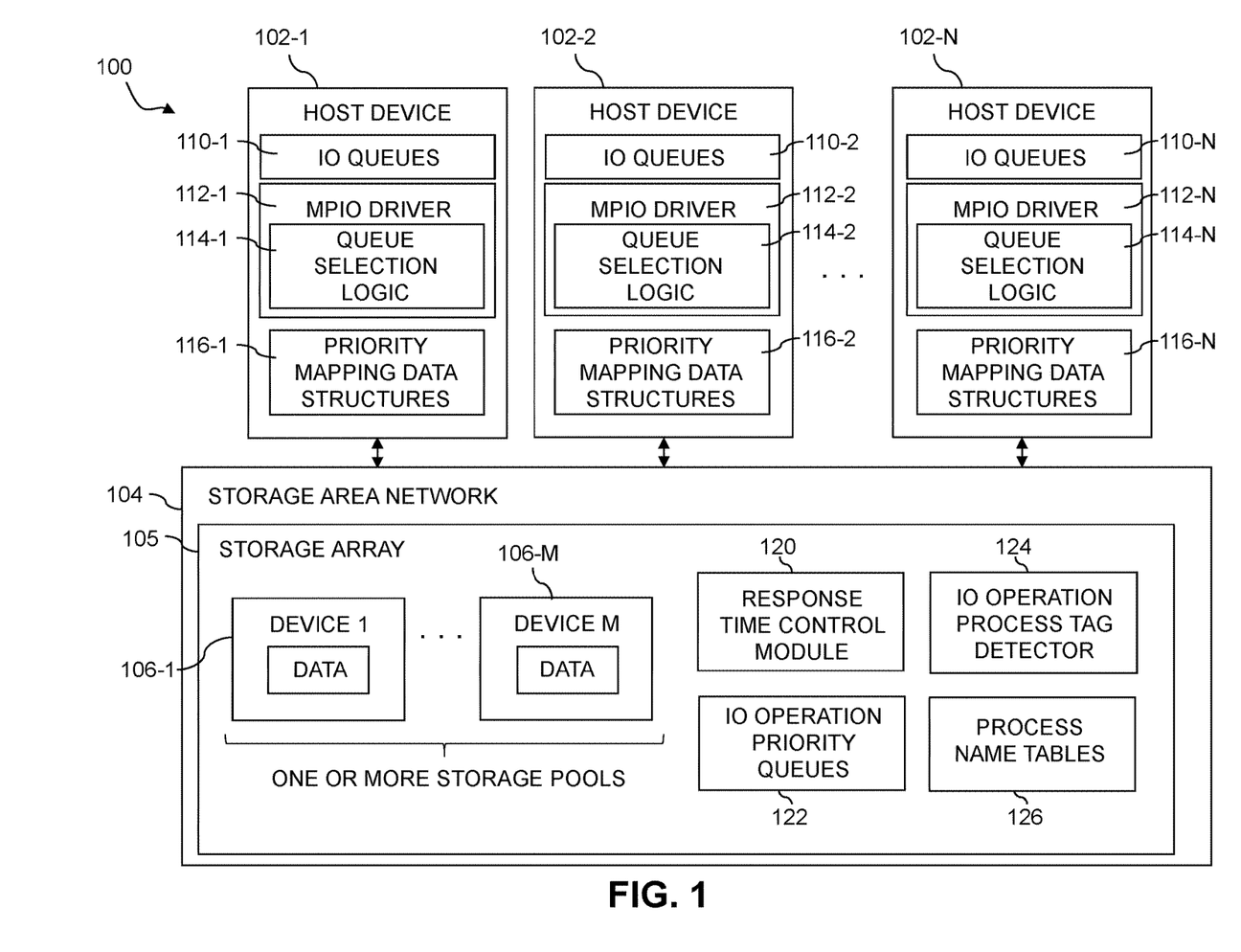
FIG. 1 is a block diagram of an information processing system configured with functionality for queue selection in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 is an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) that are configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for queue selection logic 114-1, 114-2, . . . 114-N implemented within the MPIO drivers 112.

Figure 2:
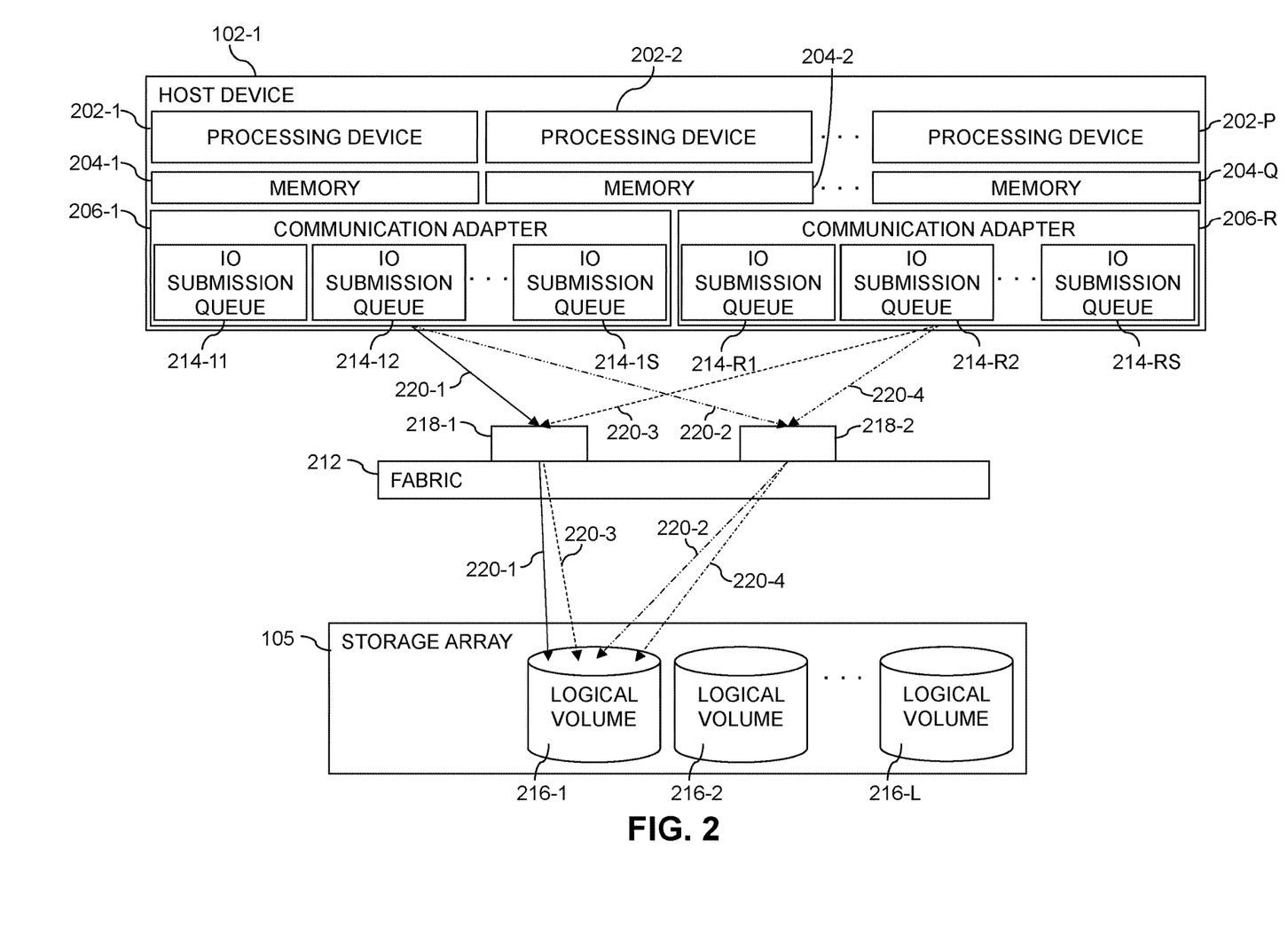
FIG. 2 is a block diagram illustrating an example implementation of a host device in the information processing system of FIG. 1 in an illustrative embodiment.

With reference now to FIG. 2, the components and functionality of host devices 102 will be described in more detail with reference to host device 102-1 as an example. Host devices 102-2 through 102-N may comprise similar components and functionality to those described herein with reference to host device 102-1.

Host device 102-1 illustratively comprises a plurality of processing devices 202, e.g., processing devices 202-1, 202-2 . . . 202-P, memory 204, e.g., memory 204-1, 204-2 . . . 204-Q, and communication adapters 206, e.g., communication adapters 206-1 . . . 206-R. In illustrative embodiments, communication adapters 206 comprise NVMe communication adapters. In some embodiments, host device 102-1 may also comprise one or more SCSI communication adapters or any other types of communication adapters.

The processing devices 202 may comprise microprocessors, microcontrollers, application-specific integrated circuits (ASICs), field-programmable gate arrays (FPGAs), graphics processing units (GPUs) or other types of processing circuitry, as well as portions or combinations of such circuitry elements.

The memory 204 may comprise random access memory (RAM), read-only memory (ROM), flash memory or other types of memory, in any combination.

The communication adapters 206 may comprise, for example, HBAs or any other communication or network adapter that may be used to connect to a network such as, e.g., network fabric 212, and allow communication between the host device 102-1 and storage array 105 via the network fabric 212. In the example of FIG. 2, the communication adapters 206 implement an NVMe architecture. For example, NVMe communication adapters can each have multiple hardware IO submission queues depending on the HBA vendor. As an example, an NVMe over fabric (NVMeOF) capable HBA can have up to 64 k IO submission queues and 64 k IO completion queues. Other numbers of IO submission queues and IO completion queues may be present in other embodiments.

In illustrative embodiments, for example, communication adapter 206-1 comprises IO submission queues 214-11, 214-12 . . . 214-1S and communication adapter 206-R comprises IO submission queues 214-R1, 214-R2 . . . 214-RS. In some embodiments communication adapter 206-1 may comprise the same number of IO submission queues 214 as communication adapter 206-R or one or more of the other communication adapters 206, e.g., 64 k IO submission queues as mentioned above for an NVMeOF HBA. In some embodiments, communication adapter 206-1 may comprise a different number of IO submission queues 214 than communication adapter 206-R or one or more of the other communication adapters 206. For example, communication adapter 206-1 may be a different model or brand than communication adapter 206-R or one or more of the other communication adapters 206 which has a different number of IO submission queues 214. In illustrative embodiments, the communication adapters 206 are connected to network fabric 212, for example via ports or other network interfaces such as, e.g., a PCI slot.

Each IO submission queue 214 may have a priority class. For example, in illustrative embodiments, a given IO submission queue 214 may have a priority class according to Table 1shown below, where each priority class has a value, e.g., 00b, 01b, 10b, or 11b, and a corresponding definition, e.g., Urgent, High, Medium, or Low. The priority class of each IO submission queue 214 may be specified during creation, specified by a user, or specified in another manner. Other values or definitions may also or alternatively be used for the priority classes of the IO submission queues 214.

TABLE 1

| Value | Definition |
|-------|------------|
| 00b   | Urgent     |
| 01b   | High       |
| 10b   | Medium     |
| 11b   | Low        |

NVMe HBA drivers may utilize these NVMe priority classes, for example, when the weighted round robin with urgent priority arbitration mechanism of the NVMe protocol is utilized.

MPIO drivers typically group all paths from a host device to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

For example, as seen in FIG. 2, storage array 105 comprises a plurality of logical volumes 216-1, 216-2 . . . 216-L, e.g., residing on storage devices 106-1 . . . 106-M (FIG. 1). The host device 102-1 communicates with a given logical volume via one or more paths each comprising an IO submission queue and a communication adapter of the host device 102-1, a portion of the network fabric 212 and the given logical volume. For example, host device 102-1 may communicate with logical volume 216-1 via a path which comprises IO submission queue 214-11 and communication adapter 206-1 of the host device 102-1, portion 218-1 of the network fabric 212 and logical volume 216-1. The portions 218 of the network fabric 212 may comprise, for example, e.g., network infrastructure, ports, or other similar network components. In some embodiments, each path may also comprise a logical volume 216 that is the destination of the path.

In some embodiments, the communication adapter and corresponding IO submission queue of a path may together be referred to as an initiator-queue (I_Q) nexus for the path, where I represents an initiator (e.g., a communication adapter) and Q represents a queue (e.g., an IO submission queue) for the path. For example, a given I_Q nexus may comprise communication adapter 206-1 and IO submission queue 214-11. As another example, another I_Q nexus may comprise communication adapter 206-R and IO submission queue 214-R2. Any other pairing of communication adapters 206 and IO submission queues 214 may form an I_Q nexus. In some embodiments, an I_Q nexus may also be referred to as an I_Q pair. In some embodiments, the same I_Q nexus may be utilized by multiple paths where, for example, the paths may comprise different portions 218 of the fabric 212, different logical volumes 216, or both.

A communication adapter and corresponding portion of network fabric 212 may together may be referred to as an initiator-target (I_T) nexus for a path, where I represents an initiator (e.g., communication adapter) and T represents a target (e.g., a portion of network fabric 212) for the path. For example, a given I_T nexus may comprise communication adapter 206-1 and portion 218-1. As another example, another I_T nexus may comprise communication adapter 206-1 and portion 218-2. As another example, another I_T nexus may comprise communication adapter 206-R and portion 218-2. Any other pairing of communication adapters 206 and portions 218 may form an I_T nexus. In some embodiments, an I_T nexus may also be referred to as an I_T pair. In some embodiments, the same I_T nexus may be utilized by multiple paths where, for example, the paths may comprise different IO submission queues 214 of the communication adapter included in the I_T nexus, different logical volumes 216, or both.

As described above, each path may comprise a queue, an initiator, a target and a logical volume. In some embodiments, the initiator, target, and logical volume may be referred to as an initiator-target-logical volume (I_T_L) nexus. In some embodiments, an I_T_L nexus may also be referred to as an I_T_L triad. In illustrative embodiments, the initiator, queue, target and logical volume may be referred to as an initiator-queue-target-logical volume (I_Q_T_L) nexus. In some embodiments, an I_Q_T_L nexus may also be referred to as an I_Q_T_L quad.

As illustrated in FIG. 2, for example, an I_T_L nexus 220-1 may comprise communication adapter 206-1, portion 218-1 of network fabric 212 and logical volume 216-1. As another example, an I_T_L nexus 220-2 may comprise communication adapter 206-1, portion 218-2 of network fabric 212 and logical volume 216-1. As another example, an I_T_L nexus 220-3 may comprise communication adapter 206-R, portion 218-1 of network fabric 212 and logical volume 216-1. As another example, an I_T_L nexus 220-4 may comprise communication adapter 206-R, portion 218-2 of network fabric 212 and logical volume 216-1. Thus, in the example of FIG. 2, I_T_L nexuses 220-1, 220-2, 220-3 and 220-4 are illustrated between the communication adapters 206-1 and 206-R of the host device 102-1 and the target logical volume 216-1, two for each of communication adapters 206-1 and 206-R. While only two I_T_L nexuses 220 are illustrated in FIG. 2 for each of communication adapters 206-1 and 206-R, it is understood that any number of additional I_T_L nexuses 220 may also be included. For example, where additional portions 218 of network fabric 212 are available for use, additional I_T_L nexuses 220 that include those additional portions 218 may be included. Also, additional I_T_L nexuses 220 may be included for providing IO operations to logical volumes 216 other than logical volume 216-1. Finally, where host device 102-1 comprises additional communication adapters 206, their associated I_T_L nexuses 220 may also be included.

Each of the I_T_L nexuses 220 may be utilized for dispatching IO operations from the IO submission queues 214 of their respective communication adapters 206 to the logical volumes 216. For example, I_T_L nexuses 220-1 and 220-2 may be utilized to dispatch IO operations that are pending in the IO submission queues 214-11, 214-12 . . . 214-1S corresponding to communication adapter 206-1 and may form an I_Q_T_L nexus for a given one of the paths. For example, IO submission queue 214-11 and I_T_L nexus 220-1 may form an I_Q_T_L nexus for a path. Likewise, IO submission queue 214-11 and I_T_L nexus 220-2 may form an I_Q_T_L nexus for another path.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the host device.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC of Hopkinton, Mass., suitably modified in the manner disclosed herein to implement functionality for queue selection. Other types of MPIO drivers from other driver vendors may be suitably modified to incorporate functionality for queue selection as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

The host devices 102 and the storage array 105 in the present embodiment are configured to implement process tag-based IO performance control functionality for one or more applications running on the host devices 102. For example, the MPIO drivers 112 of the respective host devices 102 are illustratively configured to assign process tags to respective IO operations directed by the host devices 102 to the storage array 105. Different process tags illustratively correspond to respective distinct processes of a given application, such as a distributed application running on multiple ones of the host devices 102. The storage array 105 is configured to detect the process tags and to provide different levels of performance for different processes based at least in part on the process tags assigned to IO operations generated by those processes.

The process tag-based IO performance control functionality implemented in the storage array 105 is provided at least in part by an IO operation process tag detector 124 and a set of process name tables 126 that are assumed to be stored in persistent memory of the storage array 105.

In operation, the IO operation process tag detector 124 of the storage array 105 receives commands from a given one of the host devices 102. The commands are illustratively associated with respective IO operations such as read operations or write operations that respectively involve reading data from or writing data to one or more of the storage devices 106 of the storage array 105. The given host device assigns process tags to respective ones of the IO operations before sending those IO operations to the storage array 105, with each such IO operation being in the form of one or more commands. The commands are illustratively modified to incorporate the assigned process tags.

The IO operation process tag detector 124 is configured to detect the process tags assigned to respective IO operations by the given one of the host devices 102. The process tags are illustratively of at least first and second distinct types so as to distinguish at least respective first and second distinct processes generating corresponding ones of the IO operations on the given host device. The first and second distinct processes are assumed to comprise distinct processes of a single application running on one or more of the host devices 102, although other arrangements are possible.

Responsive to a particular one of the detected process tags being determined by the IO operation process tag detector 124 to be of the first type, the storage array 105 provides a first level of priority for processing of the corresponding IO operation. Similarly, responsive to a particular one of the detected process tags being determined by the IO operation process tag detector 124 to be of the second type, the storage array 105 provides a second level of priority different than the first level of priority for processing of the corresponding IO operation. The storage array 105 is thereby configured to provide different levels of priority for processing different ones of the IO operations generated by different ones of the processes responsive to the process tags assigned to the respective IO operations by the given host device.

Terms such as "level of priority" and "priority level" as used herein are intended to be broadly construed, and can encompass a wide variety of different types of distinct processing that can be applied within storage array 105 to IO operations generated by respective distinct processes of one or more applications running on host devices 102.

In some embodiments, the process tags are assigned to the respective IO operations by the MPIO drivers 112 of the respective host devices 102. For example, the process tags may be assigned to the respective IO operations in a kernel-space portion of the MPIO driver of the given host device. Alternatively, assignment of process tags to respective IO operations may occur solely in a user-space portion of the MPIO driver, or using cooperative interaction between the user-space and kernel-space portions of the MPIO driver, instead of solely in the kernel-space portion of the MPIO driver.

As noted above, the IO operations each illustratively comprise one or more SCSI or NVMe commands, suitably modified to incorporate a corresponding assigned process tag. The commands utilized in a given embodiment can include commands that are part of a standard command set or may include custom commands such as a "vendor unique command" or VU command that is not part of a standard command set.

For example, in some embodiments, the process tags are assigned to respective ones of the IO operations by incorporating the process tags into the commands directed from the given host device to the storage array 105.

For SCSI commands, for example, the process tags may be assigned to the respective command descriptor blocks of the corresponding commands. More particularly, a given one of the process tags for one of the IO operations may be incorporated into a group number field of the command descriptor block of the corresponding command. Additionally or alternatively, the process tag may be incorporated into a VU field of the command descriptor block of the corresponding command.

For NVMe commands, for example, the process tags may be assigned to an available portion or field of the NVMe command or may be incorporated into a VU field of the NVMe command.

Numerous other arrangements are possible. For example, different portions of a given process tag for one of the IO operations can be inserted into respective different commands in an arrangement in which the IO operation comprises multiple commands.

An example of how process tags may be used in assigning different ones of the IO operations to different ones of the IO operation priority queues 122 using IO operation process tag detector 124 and process name tables 126, is disclosed in U.S. patent application Ser. No. 15/849,828, filed Dec. 21, 2017, and entitled "Storage System with Input-Output Performance Control Utilizing Application Process Detection," which is incorporated by reference herein in its entirety.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support queue selection as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and queue selection logic 114 can be used in other embodiments.

It should also be understood that the particular sets of modules and other components implemented in the system 100 as illustrated in FIGS. 1 and 2 are presented by way of example only. In other embodiments, only subsets of these components, or additional or alternative sets of components, may be used, and such components may exhibit alternative functionality and configurations.

As mentioned above, an MPIO driver is often used to select a path for dispatching IO operations from a host device to the storage array. While submitting an IO operation to an NVMe or SCSI HBA driver, the MPIO driver often selects any available IO submission queue of a communication adapter and submits the IO operation to that IO submission queue. This traditional method does not utilize or consider whether a priority level associated with the application, for example, based on the process tags as described above, matches or corresponds to NVMe priority class of the IO submission queue, which may result in an underutilization of the separate NVMe priority classes for the IO submission queues.

The use of process tags allows a storage array to associate different application priority levels with various application processes and threads. These application priority levels may comprise, for example, values corresponding to levels of Quality of Service (QoS) or other metrics that may be used by the storage array in determining resource allocation. For example, the host may provide a hinting mechanism in the form of the above described process tags which mark IO operations issued from specified applications as part of the IO operation command, as described above.

In illustrative embodiments, queue selection logic 114 is configured to select an IO submission queue for dispatching an IO operation based on the process tag values received by the host device from the storage array as part of the command for that IO operation. For example, MPIO driver 112-1 implements queue selection logic 114-1 that is configured to obtain a process tag value for an IO operation from the storage array 105. The queue selection logic 114-1 determines an application priority level for that IO operation by mapping the obtained process tag value to the application priority level using storage system priority classes that are established for the process tag values. Queue selection logic 114-1 then maps the application priority levels of the IO operations to the NVMe priority classes of the IO submission queues 214 mentioned above with reference to table 1. MPIO driver 112-1 dispatches the IO operations on those IO submission queues 214 that correspond to the mapped application priority levels using MPIO load balancing techniques.

In illustrative embodiments, the host devices 102 maintain one or more priority mapping data structures 116-1, 116-2, ... 116-N such as, e.g., databases, arrays or other data structures, which are used by queue selection logic 114 to map the process tag values associated with IO operations to the priority classes of the IO submission queues 214. The priority mapping data structures 116 may be included as part of the MPIO drivers 112 on the host devices 102 or may be stored separate from the MPIO drivers 112 on the host devices 102.

An example of a first priority mapping data structure that maps process tag values to application priority levels is illustrated in Table 2, below.

TABLE 2

| Application ID | Process Tag Value | Storage System Priority Class | Application Priority Level |
|---|---|---|---|
| App1 | 13 | Gold | 1 |
| App2 | 20 | Silver | 2 |
| App3 | 18 | Silver | 2 |
| App4 | 16 | Silver | 2 |
| App5 | 15 | Bronze | 3 |
| App6 | 14 | Bronze | 3 |
| App7 | 12 | Gold | 1 |
| App8 | 17 | Bronze | 3 |

Each entry in Table 2 comprises an application identifier, e.g., App1, a process tag value, e.g., 13, its corresponding storage system priority class, e.g., Gold, and its application priority level, e.g., 1. In some embodiments, the application priority level corresponds to QoS or another value. The process tag value may be obtained from the process tag that is submitted as part of the IO command to the storage array 105. In some embodiments, the storage array 105 may also provide the storage system priority classes and their correspondence to process tag values to the host devices 102.

As seen in Table 2, the entry for App1 has a process tag value of 13 which corresponds to a storage system priority class of Gold and maps to an application priority level of 1, the entry for App2 has a process tag value of 20 which corresponds to a storage system priority class of Silver and maps to an application priority level of 2, and so on. The process tag values and corresponding storage system priority classes may be user defined, pre-configured upon system initialization, or defined in any other manner. As mentioned above, the storage system priority classes and their correspondence to the process tag values may be obtained by the host devices 102 from the storage array 105. In some embodiments, the application priority level that corresponds to each storage system priority class may also be user defined, pre-configured upon system initialization, or defined in any other manner.

In some embodiments, some or all of the priority mapping data structures 116 are maintained by the storage array 105 and provided by the storage array 105 to the corresponding to the MPIO drivers 112 via vendor specific commands. In such an embodiment, the correspondence between process tag values and storage system priority classes and the mapping to application priority levels will be determined based on the priority mapping data structures obtained by the MPIO drivers 112 from the storage array 105. These priority mapping data structures may be obtained during system initialization or at any other time. For example, if during operation a mapping or correspondence has changed in one or more of the priority mapping data structures, e.g., the correspondence between process tag values and storage system priority class values have changed or the mapping between the storage system priority class values and the application priority levels have changed, the one or more of the priority mapping data structures may be re-provided to the MPIO drivers 112 for use in determining the correspondence between the process tag values and storage system priority classes and the mapping from the storage system priority classes to the application priority levels.

An example of a second priority mapping data structure that maps application priority levels to I_T nexuses, IO submission queues and IO submission queue priority classes is illustrated in Table 3, below.

TABLE 3

| I_T Nexus ID | Application Priority Levels | IO Submission Queue Priority Class | IO Submission Queue IDs |
| --- | --- | --- | --- |
| I_T_1 | 1 | Urgent | 1, 2, 3, 4 |
| I_T_1 | 2 | High | 5, 6, 7, 8 |
| I_T_1 | 3 | Medium | 9, 10, 11, 12 |
| I_T_2 | 1 | Urgent | 1, 2, 3, 4 |
| I_T_2 | 2 | High | 5, 6 |
| I_T_2 | 3 | Medium | 8, 9 |

Each entry in Table 3 comprises an I_T Nexus Identifier, e.g., I_T_1, an application priority level, e.g., 1, a corresponding IO submission queue priority class, e.g., Urgent, and IO submission queue identifiers for each IO submission queue of that I_T nexus that has that IO submission queue priority class, e.g., IO submission queue 1.

As shown above in Table 3, IO submission queues 1, 2, 3 and 4 of I_T nexus 1 (I_T_1) have an Urgent IO submission queue priority class and are mapped to the application priority level 1, IO submission queues 5, 6, 7 and 8 of I_T_1 have the High IO submission queue priority class and are mapped to the application priority level 2 and IO submission queues 9, 10, 11, and 12 of I_T_1 have the Medium IO submission queue priority class and are mapped to the application priority level 3. As can be seen in Table 3, the IO submission queues of I_T nexus 2 (I_T_2) are not necessarily mapped to the same IO submission queue priority classes and application priority levels as the corresponding IO submission queues of I_T_1. For example, as seen in Table 3, IO submission queues 8 and 9 of I_T_2 have a Medium IO submission queue priority class while IO submission queues 8 and 9 of I_T_1 are split between the High (8) and Medium (9) IO submission queue priority classes.

While described above as separate first and second priority mapping data structures, as shown in Tables 2 and 3, in some embodiments, the first and second priority mapping data structures may be combined to form a single priority mapping data structure which maps an application to one or more IO submission queues having a priority class corresponding to its process tag value. In some embodiments, the combined table does not include the application priority level as an intermediate mapping and instead maps each application directly to the IO submission queue priority classes and corresponding IO submission queues of each I_T nexus. An example combined priority mapping data structure is illustrated in Table 4, below.

TABLE 4

| Application ID | Process Tag Value | IO Submission Queue Priority Class | I_T Nexus ID | IO Submission Queue IDs |
| --- | --- | --- | --- | --- |
| App1 | 13 | Urgent | I_T_1 | 1, 2, 3, 4 |
|  |  |  | I_T_2 | 1, 2, 3, 4 |
| App2 | 20 | High | I_T_1 | 5, 6, 7, 8 |
|  |  |  | I_T_2 | 5, 6 |
| App3 | 18 | High | I_T_1 | 5, 6, 7, 8 |
|  |  |  | I_T_2 | 5, 6 |
| App4 | 16 | High | I_T_1 | 5, 6, 7, 8 |
|  |  |  | I_T_2 | 5, 6 |
| App5 | 15 | Medium | I_T_1 | 9, 10, 11, 12 |
|  |  |  | I_T_2 | 8, 9 |
| App6 | 14 | Medium | I_T_1 | 9, 10, 11, 12 |
|  |  |  | I_T_2 | 8, 9 |
| App7 | 12 | Urgent | I_T_1 | 1, 2, 3, 4 |
|  |  |  | I_T_2 | 1, 2, 3, 4 |
| App8 | 17 | Medium | I_T_1 | 9, 10, 11, 12 |
|  |  |  | I_T_2 | 8, 9 |

Each entry in Table 4 comprises an application identifier, e.g., App1, its corresponding process tag value, e.g., 13, an IO submission queue priority class corresponding to the process tag value, e.g., Urgent, an I_T Nexus Identifier for each I_T nexus that may be used to service IO operations for this application, e.g., I_T 1 and I_T 2, and IO submission queue identifiers for each IO submission queue of that I_T nexus that has that IO submission queue priority class, e.g., IO submission queues 1, 2, 3 and 4.

Figure 3:
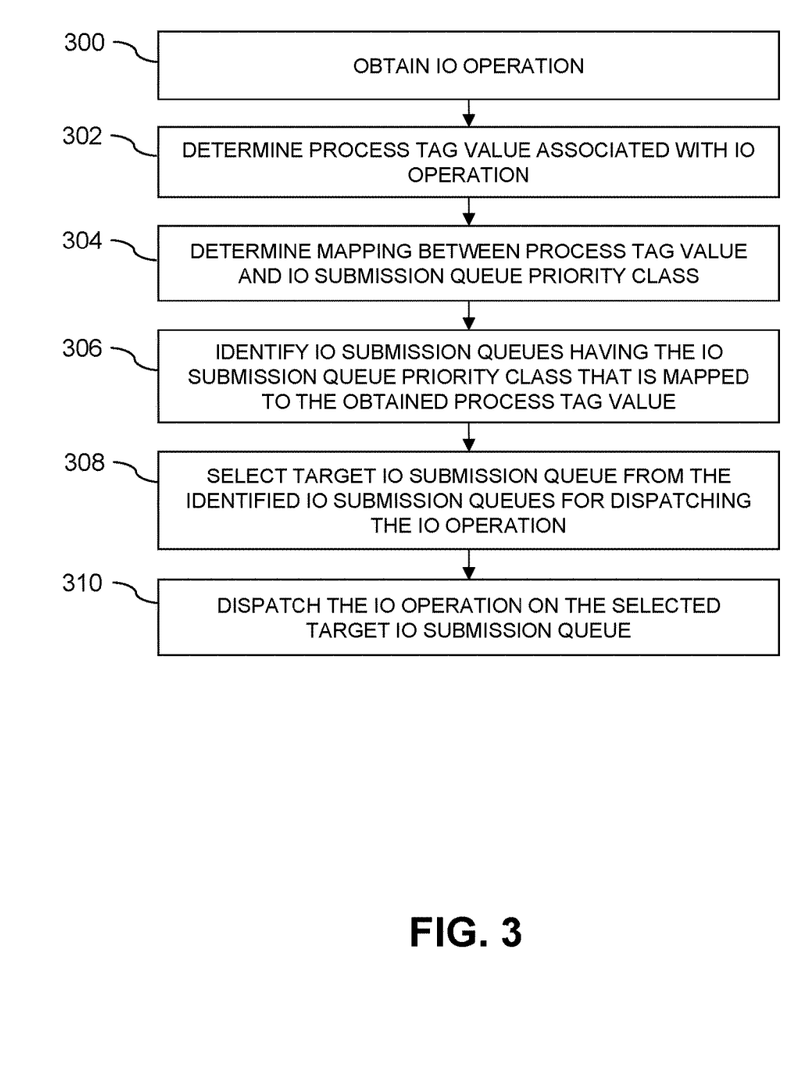
FIG. 3 is a flow diagram of an example process for queue selection in an illustrative embodiment.

Illustrative embodiments of the techniques and functionality of queue selection logic 114 will now be described in more detail with reference to the flow diagram of FIG. 3. FIG. 3 provides an example process that is implemented by queue selection logic 114 for selecting IO submission queues 214 for dispatching IO operations to logical volumes 216 that takes into account both process tag values associated with the IO operations to be dispatched and priority classes of the IO submission queues 214 of the communication adapters 206.

The process as shown in FIG. 3 includes steps 300 through 310, and is suitable for use in the system 100 but is more generally applicable to other types of systems comprising multiple host devices and a shared storage system. Reference is also made to FIGS. 1 and 2.

At 300, the MPIO driver 112-1 obtains an IO operation from IO queues 110-1 for dispatch to the storage array 105.

At 302, queue selection logic 114-1 obtains the process tag value for the IO operation. For example, the process tag value may be determined based at least in part on a process tag included in a command issued in association with the IO operation. In some embodiments, for example, an IO command associated with an application is submitted to the storage array 105. The IO command may comprise a process tag, for example, as part of a command header or other portion of the command, as described above. The storage array 105 may provide the process tag, or information associated with the process tag, to the MPIO driver 112-1 for use in determining the process tag value for the IO operation associated with the IO command.

At 304, queue selection logic 114-1 determines a mapping between the determined process tag value and the IO submission queue priority classes of the IO submission queues 214. For example, queue selection logic 114-1 may utilize one or more of the priority mapping data structures 116-1 to determine the mapping.

In some embodiments, for example, queue selection logic 114-1 may first determine a correspondence between the determined process tag value and a storage system priority class.

Based at least in part on the correspondence, queue selection logic 114-1 may determine a mapping between the process tag value and an application priority level. For example, queue selection logic 114-1 may access the example first priority mapping data structure shown in Table 2 to determine the correspondence between the process tag value and storage system priority value and the mapping between the process tag value and the application priority level based on that correspondence. In an example scenario, where the determined process tag value for App2 is 20, queue selection logic 114-1 may utilize the example first priority mapping data structure of Table 2 to determine that the corresponding storage system priority class for App2 is Silver. Queue selection logic 114-1 may then determine that a storage system priority class of Silver corresponds to an application priority level of 2. Based on these correspondences, queue selection logic 114-1 determines that App2, with a process tag value of 20, maps to an application priority value of 2.

Next, queue selection logic 114-1 determines a mapping between the application priority value and a given IO submission queue priority class of the IO submission queues 214. For example, queue selection logic 114-1 may access the example second priority mapping data structure shown in Table 3 to determine the mapping between the application priority level and a given IO submission queue priority class of the IO submission queues 214. In the above-mentioned scenario, for example, where the application priority level is 2, queue selection logic 114-1 may utilize the example second priority mapping data structure of Table 3 to determine that an application priority level of 2 maps to an IO submission queue priority class of High.

In other embodiments, queue selection logic 114-1 may determine a mapping between the obtained process tag value and the given IO submission queue priority class, for example, by accessing the example combined priority mapping data structure of Table 4.

In some embodiments, some or all of the priority mapping data structures 116-1 may be obtained by the host device 102-1 from storage array 105 for use by queue selection logic 114-1.

At 306, queue selection logic 114-1 identifies the IO submission queues 214 that have the IO submission queue priority class that is determined to map to the determined process tag value. For example, queue selection logic 114-1 may utilize one or more of the priority mapping data structures 116-1 to identify which IO submission queues have the IO submission queue priority class that is mapped to the determined process tag value. For example, queue selection logic 114-1 may utilize the example second priority mapping data structure of Table 3 or the example combined priority mapping data structure of Table 4 to determine which IO submission queues have the IO submission queue priority that is mapped to the determined process tag value. In the example scenario described above, for example, the second priority mapping data structure of Table 3 or the example combined priority mapping data structure of Table 4 may be utilized to determine that IO submission queues 5, 6, 7 and 8 of I_T nexus I_T 1 and IO submission queues 5 and 6 of I_T nexus I_T_2 have the IO submission queue priority class that is mapped to App2 with the determined process tag value of 20.

At 308, queue selection logic 114-1 selects a target IO submission queue from the identified IO submission queues 214 for dispatching the IO operation. For example, queue selection logic 114-1 may utilize common MPIO load balancing techniques to determine which of the identified IO submission queues 214 to select as the target IO submission queue for dispatching IO operation.

In some embodiments, queue selection logic 114-1 may examine each of the identified IO submission queues having the mapped IO submission queue priority class starting with a given IO submission queue of the identified IO submission queues. Queue selection logic 114-1 may determine a queue depth of the given IO submission queue and a number of IO operations that are pending on the given IO submission queue. If the number of IO operations that are pending on the given IO submission queue is less than the determined queue depth, queue selection logic 114-1 may select the given IO submission queue as the target IO submission queue. If the number of IO operations that are pending on the given IO submission queue is greater than or equal to the determined queue depth, queue selection logic 114-1 may examine the next identified IO submission queue which has the same IO submission queue priority class and make similar queue depth determinations.

In some embodiments, if all of the identified IO submission queues in the same priority class have a number of IO operations greater than or equal to their respective determined queue depths, queue selection logic 114-1 may examine the IO submission queues having a next higher priority class in a similar manner. For example, if the process tag value maps to the medium IO submission queue priority class but all of the IO submission queues that have the medium IO submission queue priority class have a number of pending IO operations greater than or equal to their respective queue depths, queue selection logic 114-1 may examine the IO submission queues that have the high IO submission queue priority class as potential target IO submission queues for the IO operation. If one of the IO submission queues that has the high IO submission queue priority class has fewer IO operations pending than its respective queue depth, queue selection logic 114-1 may select that IO submission queue as the target IO submission queue. If all of the IO submission queues that have the high IO submission queue priority class have a number of IO operations greater than or equal to their respective determined queue depths, queue selection logic 114-1 may examine the IO submission queues having a next higher priority class in a similar manner, e.g., the IO submission queues having the urgent IO submission queue priority class. This process may continue until an IO submission queue having at least the IO submission queue priority class that maps to the process tag value and a number of pending IO operations that is less than the queue depth of that IO submission queue has been found by queue selection logic 114-1. At 310, queue selection logic 114-1 dispatches the IO operation on the selected target IO submission queue.

Separate instances of the process of FIG. 3 may be performed in respective additional host devices that share the storage array.

The particular processing operations and other system functionality described in conjunction with the flow diagram of FIG. 3 is presented by way of illustrative example only, and should not be construed as limiting the scope of the disclosure in any way. Alternative embodiments can use other types of processing operations involving host devices, storage systems and queue selection logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different queue selection logic arrangements within a given information processing system.

Functionality such as that described in conjunction with the flow diagram of FIG. 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for queue selection are carried out at least in part under the control of its queue selection logic 114. For example, queue selection logic 114 is illustratively configured to control performance of portions of the process shown in the flow diagram described above in conjunction with FIG. 3.

In some embodiments, a given application or process tag value may not be included in the priority mapping data structures 116. For example, storage array 105 may not have a particular priority value associated with the given application. In such a case, queue selection logic 114 may select any communication adapter or I_T nexus according to typical MPIO load balancing techniques for dispatching an IO operation received from the given application and may dispatch that IO operation to the selected communication adapter or I_T nexus as if it had a low IO submission queue priority class. For example, where a given application is not included in the priority mapping data structures 116, any IO operations received from that given application may be relegated to low priority during dispatch to the IO submission queues 214.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for queue selection. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support queue selection.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for queue selection as disclosed herein, IO load balancing in NVMe-based architectures may be inefficient since the loads will typically be sent to any available IO submission queue of a given communication adapter without mapping the process tag value associated with the IO operation to priority classes of the IO submission queues.

Such drawbacks are advantageously overcome in illustrative embodiments herein by utilization of queue selection logic 114 to implement functionality for queue selection as described above. For example, the disclosed techniques implement MPIO drivers that provide mapping and path selection for the application and storage array defined process tag values and corresponding priority levels based on the priority classes of the IO submission queues. This mapping improves the effectiveness of application process tagging on the storage system. By utilizing the MPIO drivers as intermediaries for mapping application process tag values to the priority classes of the NVMe IO submission queues, the disclosed techniques also extend application process tagging to the NVMe environment. For example, the disclosed techniques configure the storage system to handle the NVMe weighted round robin with urgent priority scheduling arbitration mechanism in a manner that allows the host device, through application process tagging, to manage IO operations using storage system priority classes and corresponding application priority levels to map the process tag values to NVMe defined priority classes for the NVMe IO submission queues.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S 3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the queue selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, communication adapters, IO submission queues, queue selection logic, priority mapping data structures, or alternative components. Also, the particular configurations of system and device elements and associated processing operations illustratively shown in the drawings can be varied in other embodiments. For example, a wide variety of different MPIO driver configurations and associated queue selection logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising:
at least one processing device and a plurality of communication adapters, each communication adapter comprising a plurality of input-output submission queues, each of the input-output submission queues having a submission queue priority class; and
a multi-path input-output driver configured to deliver input-output operations from the host device to the storage system over the network;
wherein the multi-path input-output driver is further configured:
to obtain an input-output operation that targets a given logical volume of the storage system;
to determine a process tag value associated with the obtained input-output operation;
to determine a mapping between the determined process tag value and a given submission queue priority class;
to identify one or more of the input-output submission queues as having the given submission queue priority class based at least in part on the mapping;
to select a target input-output submission queue from the identified one or more input-output submission queues; and
to dispatch the obtained input-output operation to the selected target input-output submission queue.

2. The apparatus of claim 1 wherein determining the mapping between the determined process tag value and the given submission queue priority class comprises obtaining at least one priority mapping data structure and accessing an entry in the obtained at least one priority mapping data structure that corresponds to the determined process tag value to map the determined process tag value to the given submission queue priority class.

3. The apparatus of claim 2 wherein the at least one priority mapping data structure comprises a first priority mapping data structure and a second priority mapping data structure;
wherein the first priority mapping data structure comprises a first plurality of entries, each entry of the first plurality of entries corresponding to one of a plurality of process tag values, the plurality of process tag values comprising the determined process tag value;
wherein the entry of the first plurality of entries that corresponds to the determined process tag value maps the determined process tag value to a corresponding application priority level; and
wherein the second priority mapping data structure comprises a second plurality of entries, a given entry of the second plurality of entries comprising the corresponding application priority level, the given entry mapping the corresponding application priority level to the given submission queue priority class.

4. The apparatus of claim 3 wherein the entry of the first plurality of entries that corresponds to the determined process tag value comprises a storage system priority class;
wherein the storage system priority class defines a correspondence between the process tag value and the application priority level; and
wherein the mapping of the determined process tag value to the corresponding application priority level is based at least in part on the correspondence defined by the storage system priority class.

5. The apparatus of claim 3 wherein the given entry of the second plurality of entries further comprises an indication of which input-output submission queues of the plurality of input-output submission queues have the given submission queue priority class; and
wherein identifying the one or more of the input-output submission queues as having the given submission queue priority class based at least in part on the mapping comprises identifying the one or more of the input-output submission queues based at least in part on the given entry of the second plurality of entries of the second priority mapping data structure.

6. The apparatus of claim 2 wherein the at least one priority mapping data structure comprises a plurality of entries, each entry of the plurality of entries corresponding to one of a plurality of process tag values, the plurality of process tag values comprising the determined process tag value; and
wherein a given entry of the plurality of entries that corresponds to the determined process tag value maps the determined process tag value to the given submission queue priority class.

7. The apparatus of claim 6 wherein the given entry of the plurality of entries further comprises an indication of which input-output submission queues of the plurality of input-output submission queues have the given submission queue priority class; and
wherein identifying the one or more of the input-output submission queues as having the given submission queue priority class based at least in part on the mapping comprises identifying the one or more of the input-output submission queues based at least in part on the given entry of the plurality of entries of the at least one priority mapping data structure.

8. The apparatus of claim 1 wherein the plurality of input-output submission queues comprise non-volatile memory express (NVMe) input-output submission queues.

9. A method comprising:
obtaining, by a multi-path input-output driver of a host device configured to communicate over a network with a storage system comprising a plurality of storage devices, an input-output operation that targets a given logical volume of the storage system, the host device comprising at least one processing device and a plurality of communication adapters, each communication adapter comprising a plurality of input-output submission queues, each of the input-output submission queues having a submission queue priority class;
determining, by the multi-path input-output driver, a process tag value associated with the obtained input-output operation;
determining, by the multi-path input-output driver, a mapping between the determined process tag value and a given submission queue priority class;

identifying, by the multi-path input-output driver, one or more of the input-output submission queues as having the given submission queue priority class based at least in part on the mapping;

selecting, by the multi-path input-output driver, a target input-output submission queue from the identified one or more input-output submission queues; and dispatching, by the multi-path input-output driver, the obtained input-output operation to the selected target input-output submission queue.

10. The method of claim 9 wherein determining the mapping between the determined process tag value and the given submission queue priority class comprises obtaining at least one priority mapping data structure and accessing an entry in the obtained at least one priority mapping data structure that corresponds to the determined process tag value to map the determined process tag value to the given submission queue priority class.

11. The method of claim 10 wherein the at least one priority mapping data structure comprises a first priority mapping data structure and a second priority mapping data structure;

wherein the first priority mapping data structure comprises a first plurality of entries, each entry of the first plurality of entries corresponding to one of a plurality of process tag values, the plurality of process tag values comprising the determined process tag value;

wherein the entry of the first plurality of entries that corresponds to the determined process tag value maps the determined process tag value to a corresponding application priority level; and wherein the second priority mapping data structure comprises a second plurality of entries, a given entry of the second plurality of entries comprising the corresponding application priority level, the given entry mapping the corresponding application priority level to the given submission queue priority class.

12. The method of claim 11 wherein the entry of the first plurality of entries that corresponds to the determined process tag value comprises a storage system priority class;

wherein the storage system priority class defines a correspondence between the process tag value and the application priority level; and wherein the mapping of the determined process tag value to the corresponding application priority level is based at least in part on the correspondence defined by the storage system priority class.

13. The method of claim 11 wherein the given entry of the second plurality of entries further comprises an indication of which input-output submission queues of the plurality of input-output submission queues have the given submission queue priority class; and wherein identifying the one or more of the input-output submission queues as having the given submission queue priority class based at least in part on the mapping comprises identifying the one or more of the input-output submission queues based at least in part on the given entry of the second plurality of entries of the second priority mapping data structure.

14. The method of claim 10 wherein the at least one priority mapping data structure comprises a plurality of entries, each entry of the plurality of entries corresponding to one of a plurality of process tag values, the plurality of process tag values comprising the determined process tag value; and wherein a given entry of the plurality of entries that corresponds to the determined process tag value maps the determined process tag value to the given submission queue priority class.

15. The method of claim 14 wherein the given entry of the plurality of entries further comprises an indication of which input-output submission queues of the plurality of input-output submission queues have the given submission queue priority class; and wherein identifying the one or more of the input-output submission queues as having the given submission queue priority class based at least in part on the mapping comprises identifying the one or more of the input-output submission queues based at least in part on the given entry of the plurality of entries of the at least one priority mapping data structure.

16. The method of claim 9 wherein the plurality of input-output submission queues comprise non-volatile memory express (NVMe) input-output submission queues.

17. A computer program product comprising a non-transitory processor-readable storage medium having stored therein program code of one or more software programs, wherein the program code, when executed by a host device that is configured to communicate over a network with a storage system comprising a plurality of storage devices, the host device comprising at least one processing device and a plurality of communication adapters, each communication adapter comprising a plurality of input-output submission queues, each of the input-output submission queues having a submission queue priority class, the host device further comprising a multi-path input-output driver configured to deliver input-output operations from the host device to the storage system over the network, causes the multi-path input-output driver:

to obtain an input-output operation that targets a given logical volume of the storage system;

to determine a process tag value associated with the obtained input-output operation;

to determine a mapping between the determined process tag value and a given submission queue priority class;

to identify one or more of the input-output submission queues as having the given submission queue priority class based at least in part on the mapping;

to select a target input-output submission queue from the identified one or more input-output submission queues; and to dispatch the obtained input-output operation to the selected target input-output submission queue.

18. The computer program product of claim 17 wherein determining the mapping between the determined process tag value and the given submission queue priority class comprises obtaining at least one priority mapping data structure and accessing an entry in the obtained at least one priority mapping data structure that corresponds to the determined process tag value to map the determined process tag value to the given submission queue priority class.

19. The computer program product of claim 18 wherein the at least one priority mapping data structure comprises a first priority mapping data structure and a second priority mapping data structure;

wherein the first priority mapping data structure comprises a first plurality of entries, each entry of the first plurality of entries corresponding to one of a plurality of process tag values, the plurality of process tag values comprising the determined process tag value;

wherein the entry of the first plurality of entries that corresponds to the determined process tag value maps the determined process tag value to a corresponding application priority level;

wherein the second priority mapping data structure comprises a second plurality of entries, a given entry of the second plurality of entries comprising the corresponding application priority level, the given entry mapping the corresponding application priority level to the given submission queue priority class;

wherein the given entry of the second plurality of entries further comprises an indication of which input-output submission queues of the plurality of input-output submission queues have the given submission queue priority class; and wherein identifying the one or more of the input-output submission queues as having the given submission queue priority class based at least in part on the mapping comprises identifying the one or more of the input-output submission queues based at least in part on the given entry of the second plurality of entries of the second priority mapping data structure.

20. The computer program product of claim 18 wherein the at least one priority mapping data structure comprises a plurality of entries, each entry of the plurality of entries corresponding to one of a plurality of process tag values, the plurality of process tag values comprising the determined process tag value;

wherein a given entry of the plurality of entries that corresponds to the determined process tag value maps the determined process tag value to the given submission queue priority class;

wherein the given entry of the plurality of entries further comprises an indication of which input-output submission queues of the plurality of input-output submission queues have the given submission queue priority class; and wherein identifying the one or more of the input-output submission queues as having the given submission queue priority class based at least in part on the mapping comprises identifying the one or more of the input-output submission queues based at least in part on the given entry of the plurality of entries of the at least one priority mapping data structure.

* * * * *